United States Patent [19]

Fasterling

[11] Patent Number: 5,226,059
[45] Date of Patent: Jul. 6, 1993

[54] DSP LINE EQUALIZER

[75] Inventor: Robert D. Fasterling, Douglasville, Ga.

[73] Assignee: Northern Telecom Limited, Montreal, Canada

[21] Appl. No.: 578,458

[22] Filed: Sep. 7, 1990

[51] Int. Cl.[5] .............................................. H03H 7/40
[52] U.S. Cl. ................................. 375/12; 333/28 R; 364/724.2
[58] Field of Search ............................ 375/11, 12, 14; 364/724.2; 333/18, 28 R

[56] References Cited

U.S. PATENT DOCUMENTS 4,430,744  2/1984  Johnson ................................. 375/14
4,718,073  1/1988  Takaoka ................................ 375/14

OTHER PUBLICATIONS

AT&T Memorandum dated Nov. 20, 1974 to Chief Engineers from Engineering Director.

*Primary Examiner*—Curtis Kuntz
*Assistant Examiner*—Young Tse

[57] ABSTRACT

An integrated circuit digital signal processor (DSP) including a bump equalizer and a slope equalizer and method of implementing an equalizer in an integrated circuit digital signal processor (DSP) are provided. The memory size of the DSP and the size of numbers storable in the DSP prevent simply storing the required coefficients. The method reduces the quantity of numbers which must be stored and scales the numbers to allow their storage in the DSP.

9 Claims, 4 Drawing Sheets

DSP LINE EQUALIZER

This invention relates to an equalizer implemented using a digital signal processor (DSP) and is particularly concerned with a method of coefficient calculation for the equalizer.

Reference is directed to a copending patent application Ser. No. 578,464, assigned to Northern Telecom Limited, filed on the same day as this application and entitled "Idle Channel Noise Reduction in a Line Card having a DSP Equalizer", the entire disclosure of which is hereby incorporated herein by reference.

BACKGROUND OF THE INVENTION

In telephony an equalizer is used on a subscriber line circuit to compensate for losses in transmission by providing frequency selective attenuation. A commonly used equalizer is an analog circuit referred to as a type W309B. Bump and slope characteristics of the equalizer are set by a craftsman using switch settings. Currently, with the increasing use of digital electronic circuits in telephony for cost savings, it is desirable to implement the commonly used W309B equalizer in a digital circuit. Further, the availability of digital signal processor (DSP) integrated circuits would seem to facilitate this implementation. However, several problems are encountered which must be overcome to allow the DSP to be used to implement the type W309B equalizer. First, an earlier analysis of the W309B equalizer indicated that the switches set the gain and bandwidth characteristics of the filter. If this were the case, it would not be possible to implement the W309B equalizer on the DSP. Second, there are constraints on both the amount of memory available on the DSP and the size of numbers that can be stored in memory.

SUMMARY OF THE INVENTION

An object of the present invention is to provide an improved digital signal processor equalizer.

In accordance with one aspect of the present invention there is provided an integrated circuit digital signal processor (DSP) including a bump equalizer and a slope equalizer, the slope equalizer comprising an input and an output, first multiplier means for multiplying a sample at the input by a first slope equalizer coefficient to produce a first sample, second multiplier means for multiplying a sample at the output by a second slope equalizer coefficient to produce a second sample, first adder means for adding the first and second samples to produce a third sample, delay means for delaying the third sample by a sample interval, third multiplier means for multiplying a later sample at the input by a third slope equalizer coefficient to produce a fourth sample, and second adder means for adding the delayed third sample and the fourth sample to produce a later sample at the output.

In accordance with another aspect of the present invention there is provided an integrated circuit digital signal processor (DSP) including a bump equalizer and a slope equalizer, the bump equalizer comprising, an input and an output, first multiplier means for multiplying a sample at the input by a first bump equalizer coefficient to produce a first sample, second multiplier means for multiplying a sample at the output by a second bump equalizer coefficient to produce a second sample, first adder means for adding the first and second samples to produce a third sample, first delay means for delaying the third sample by a sample interval, third multiplier means for multiplying a first later sample at the input by a third bump equalizer coefficient to produce a fourth sample, fourth multiplier means for multiplying a first later sample at the output by a fourth bump equalizer coefficient to produce a fifth sample, second adder means for adding the delayed third sample and fourth and fifth samples to produce a sixth sample, second delay means for delaying the sixth sample by a sample interval, fifth multiplier means for multiplying a second later sample at the input by a fifth bump equalizer coefficient to produce a seventh sample, and third adder means for adding the delayed sixth sample and the seventh sample to produce a second later sample at the output.

In accordance with a further aspect of the present invention there is provided a method of implementing an equalizer in an integrated circuit digital signal processor (DSP), said method comprising the steps of defining a set of predetermined numbers from which to calculate coefficients required for implementing the equalizer, scaling the set of predetermined numbers to allow storage within the DSP, then storing the scaled set of predetermined numbers, for selected equalizer parameters, determining the coefficients using a subset of the set of predetermined numbers corresponding to the selected equalizer parameters, then scaling the coefficients to provide values thereof which are less than one, and on application of the scaled coefficients within the DSP equalizer, restoring the coefficients by multiplying by appropriate scaling factors.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
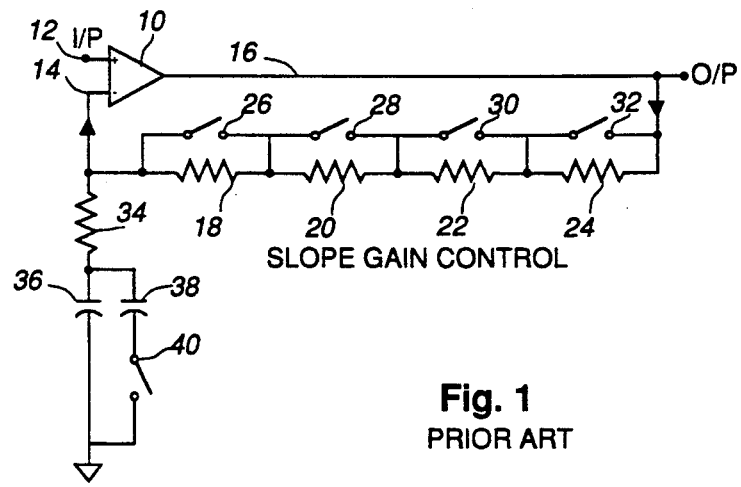
FIG. 1 schematically illustrates a known analog slope equalizer circuit.

Referring to FIG. 1, there is schematically illustrated a known analog slope equalizer circuit. The slope equalizer circuit includes an amplifier 10 with input 12, inverting input 14 and output 16. Between the output 16 and the inverting input 14 a series resistor chain having resistors 18, 20, 22, and 24 form a feedback loop for the amplifier. Switches 26, 28, 30, and 32, are each coupled across a respective one of the resistors 18, 20, 22, and 24. A resistor 34 and capacitor 36 are series connected from the inverting input 14 to ground. A second capacitor 38 and a switch 40, connected in series, are connected in parallel with the capacitor 36. In operation, the switches 26, 28, 30, and 32 control the slope gain bypassing resistors 18, 20, 22, and 24, respectively, when closed. The four switches thus provide 16 slope gain settings. The switch 40 when closed connects the capacitor 38 in parallel with the capacitor 36. This provides a control for loaded (switch 40 closed) and nonloaded (switch 40 open) states.

Figure 2:
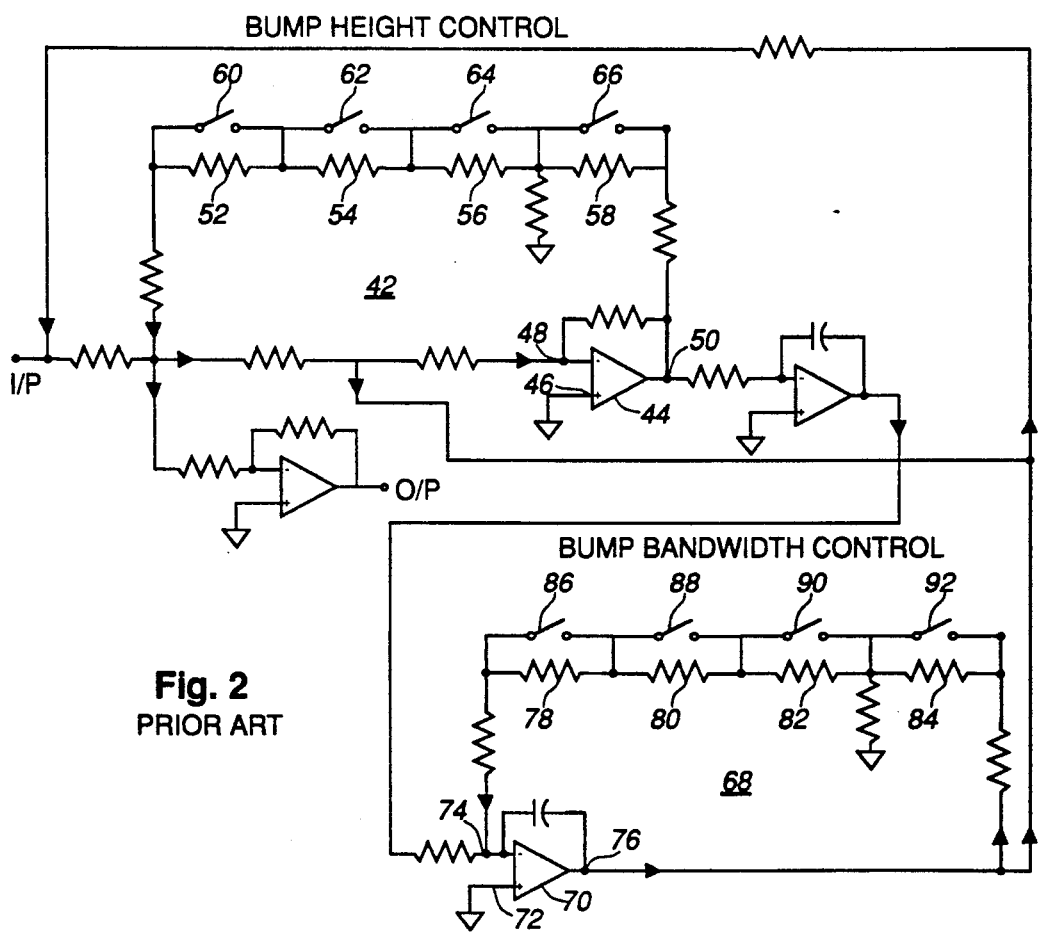
FIG. 2 schematically illustrates a known analog bump equalizer circuit.

Referring to FIG. 2, there is schematically illustrated a known analog bump equalizer circuit. The bump equalizer circuit includes a bump height control circuit 42 and a bump bandwidth control circuit 68. The bump height control circuit 42 includes an amplifier 44 with input 46, inverting input 48 and output 50. Between the output 50 and the inverting input 48 a series resistor chain including resistors 52, 54, 56, and 58 form a feedback loop for the amplifier. Switches 60, 62, 64, and 66, are each coupled across a respective one of the resistors 52, 54, 56, and 58. The bump bandwidth control circuit 68 includes an amplifier 70 with input 72, inverting input 74 and output 76. Between the output 76 and the inverting input 74 a series resistor chain including resistors 78, 80, 82, and 84 form a feedback loop for the amplifier. Switches 86, 88, 90, and 92, are each coupled across a respective one of the resistors 78, 80, 82, and 84. In operation, the switches 60, 62, 64, and 66 control the bump height by bypassing resistors 52, 54, 56, and 58, respectively, when closed. The four switches thus provide 16 bump height settings. The switches 86, 88, 90, and 92 control the bump bandwidth by bypassing resistors 78, 80, 82, and 84, respectively, when closed. The four switches thus provide 16 bump bandwidth settings.

The circuits of FIGS. 1 and 2 have a combined transfer function T(S), where $s=j\omega$, given by equation (1):

$$T(s) = \frac{1 + (G_s/W_p)s}{1 + (1/W_p)s} * \frac{s^2 + (W_0/Q_b)*G_b*s + W_0^2}{s^2 + (W_0/Q_b)*s + W_0^2}$$

(1)

where, $W_p$ is the slope pole frequency
$G_s$ is the gain of the slope equalizer circuit
$W_o$ is the bump center frequency
$Q_b$ is the quality factor (Q) of the bump equalizer
$G_b$ is the gain of the bump equalizer circuit.

The transfer function of equation (1) consists of transfer functions contributed by each of the slope and bump circuits of the equalizer. A simulation of the circuits of FIGS. 1 and 2 was used to determine if a relationship exists between the circuit switch settings and the transfer function parameters. The simulation used an analog and mix mode simulator known by the trademark PSpice belonging to Microsim. The setting for slope gain corresponds to the maximum value of the slope transfer function, that is its value when $s=j\omega$ is much greater than the $W_p$. Thus, values for $G_s$ can be obtained from simulation of the circuit at relatively high frequencies. The values obtained are given in Table A.

TABLE A

| Setting | Value for $G_s$ |
|---|---|
| 0 | 1.000 |
| 1 | 1.201 |
| 2 | 1.393 |
| 3 | 1.594 |
| 4 | 1.767 |
| 5 | 1.967 |

TABLE A-continued

| Setting | Value for $G_s$ |
|---|---|
| 6 | 2.160 |
| 7 | 2.361 |
| 8 | 2.547 |
| 9 | 2.747 |
| 10 | 2.940 |
| 11 | 3.141 |
| 12 | 3.313 |
| 13 | 3.514 |
| 14 | 3.707 |
| 15 | 3.908 |

The setting for slope pole frequency corresponds to the value for $W_p$. The values for $W_p$ are determined from the circuit values using the following equations, (2) for the circuit in a loaded state (switch 40 closed) and (3) for the circuit in the unloaded state (switch 40 open):

$$W_{p(L)} = 1/[15K*(C_1+C_2)] = 400.54 \text{ where } C_1 \text{ is capacitor 36}$$

(2)

$$W_{p(NL)} = 1/[15K*C_1] = 1634.87 \text{ and } C_2 \text{ is capacitor 38}$$

(3)

The bump equalizer circuit, shown in FIG. 2, has a response which can be described as the addition of high-pass, low-pass and band-pass filters. The circuit produces a bump centered at $W_o$ with a variable height and bandwidth. The height of the bump corresponds to the value of $G_b$. Table B lists values of $G_b$ determined from simulations of the circuit.

TABLE B

| Bump Gain Setting | Value for $G_b$ |
|---|---|
| 0 | 1.000 |
| 1 | 1.057 |
| 2 | 1.129 |
| 3 | 1.211 |
| 4 | 1.307 |
| 5 | 1.418 |
| 6 | 1.549 |
| 7 | 1.707 |
| 8 | 1.945 |
| 9 | 2.084 |
| 10 | 2.244 |
| 11 | 2.430 |
| 12 | 2.650 |
| 13 | 2.912 |
| 14 | 3.234 |
| 15 | 3.633 |

The simulations of the bump equalizer circuit showed the center of the bump to be approximately 3272 Hz ($W_o = 20558.582$ radian/second).

The remaining setting in the circuit is considered a bandwidth control. However, the simulations showed that the bandwidth of the filter combination varies with the gain setting. This indicates that a parameter corresponding to the bandwidth settings should depend on $W_o$, $W_{3dB}$, and $G_b$. Solving for $Q_b$ as a function of these three variables gives equation (4):

$$Q_b = \left[ \frac{(W_0 * W_{3dB} * G_b)^2}{(W_0^2 - W_{3dB}^2)*(G_b^2 - 2)} \right]^{\frac{1}{2}}$$

where $W_{3dB}$ is the 3 dB point on the lower frequency side of $W_0$.

Calculation of $Q_b$ using the results from the simulation of the equalizer circuit shows that $Q_b$ remains constant with respect to $G_b$. This supports a theory that the switches labelled bandwidth actually set the Q of the filter. The values for $Q_b$ are given in Table C.

TABLE C

| Bandwidth Setting | Value for $Q_b$ |
|---|---|
| 0 | 16.912 |
| 1 | 15.057 |
| 2 | 13.512 |
| 3 | 11.580 |
| 4 | 9.826 |
| 5 | 8.130 |
| 6 | 6.416 |
| 7 | 4.702 |
| 8 | 3.683 |
| 9 | 3.239 |
| 10 | 2.923 |
| 11 | 2.494 |
| 12 | 2.106 |
| 13 | 1.709 |
| 14 | 1.314 |
| 15 | 0.927 |

To produce a DSP equalizer that will duplicate the characteristics of the analog circuits of FIGS. 1 and 2, filter coefficients must be derived. This is done by a bilinear transform of equation (1) from an s-domain transfer function to a z-domain transfer function by substituting $s = 2(1-z^{-1})/T(1+z^{-1})$, where $T = 1/W_s$ and $W_s$ is the sample frequency.

The slope equalizer coefficients derived from the slope portion of the transfer function are:

$$a_0 = W_p + (2/T) \qquad a_1 = W_p - (2/T)$$
$$b_0 = (W_p/G_s) + (2/T) \qquad b_1 = (W_p/G_s) - (2/T)$$

The bump equalizer coefficients derived from the bump portion of the transfer function are:

$$a_0 = (4/T^2) + (2W_0/Q_bT) + W_0^2$$
$$a_1 = 2(W_0^2 - (4/T^2))$$
$$a_2 = (4/T^2) - (2W_0/Q_bT) + W_0^2$$
$$b_0 = (4/T^2) + (2G_bW_0/Q_bT) + W_0^2$$
$$b_1 = 2(W_0^2 - (4/T^2))$$
$$b_2 = (4/T^2) - (2G_bW_0/Q_bT) + W_0^2$$

As a result of using the bilinear transform to calculate the z-domain transfer function, the s-domain response must be prewarped so that the digital filters will have the desired response. This prewarping is accomplished by calculating new values for $W_o$, $Q_b$, and $W_p$ using equation (5):

$$W_{prewarped} = (2/T)*\tan(T*W_{analog}/2). \qquad (5)$$

The values for $W_o$ and $W_p$ can be calculated directly from equation (5). The value for $Q_b$ is calculated by prewarping the $W_o$ and $W_{3dB}$ values, then recalculating $Q_b$ using equation (4). In order to implement these coefficients in a standard structure, the $a_o$ coefficients should be 1. Thus each set of coefficients is divided by its respective $a_o$ coefficient.

As discussed above in the background, memory constraints limit both the quantity of numbers, and the size of the number that can be stored. The following describes a method used to calculate the coefficients, which reduces the number of numbers stored and keeps the size of the numbers below 1. Predetermined numbers are defined that are then used to calculate the coefficients. One DSP, for example, the TMS 320C17/E17 by Texas Instruments, has two types of memory, ROM and Data (RAM). The predetermined numbers can be stored in ROM memory along with an instrument set for the DSP. The switch settings are replaced with data, which are downloaded to the line card on provisioning, from the network, using signaling bits. Thus, provisioned values of M and N are used for the calculation of the bump equalizer coefficients, and provisioned values of L and P are used for the calculation of the slope equalizer coefficients.

For the bump equalizer, for $N = 0-15$ (Q setting) and $M = 0-15$ (gain setting), the stored numbers are defined in Table D.

TABLE D

| Predetermined Number | No. of Values | Multiplied by | Stored As |
|---|---|---|---|
| $SN1(N) = 2W_O/TQ_b$ | 16 | SN5(O) | SN1(N)*SN5(O) |
| $SN2 = 4/T^2 + WO^2$ | 1 | SN5(O) | SN2*SN5(O) |
| $SN3(M) = G_b$ | 16 | ¼ | SN3(M)*¼ |
| $SN4 = -(W_O^2 - 4/T^2)$ | 1 | SN5(O) | SN4*SN5(O) |
| $SN5(N) = 1/(SN1(N) + SN2)$ | 16 | 1/SN5(O) | SN5(N)/SN5(O) |

Note: Prewarped values of $W_O$ and $Q_b$ are used in the above.

The coefficients are then calculated using the predetermined numbers and provisioned values of M and N, and then multiplied by a factor to provide a number for storage that is less than 1. The coefficients are defined in terms of the predetermined numbers of Table D, and the multiplying factors are given in Table E.

TABLE E

| Coefficient | Definition | Multiplying Factor |
|---|---|---|
| A1(N) | SN4 * SN5(N) * 2 | ½ |
| A2(N) | (SN1(N) − SN2) * SN5(N) | 1 |
| B0(MN) | (SN2 + SN1(N)*SN3(M))*SN5(N) | ½ |
| B1(N) | −A1(N) | ½ |
| B2(MN) | (SN2 − SN1(N)*SN3(M))*SN5(N) | 1 |

Note: The coefficients B0 and B2 are calculated based on both the gain setting (M) and the Q setting (N).

For the SLOPE equalizer, for $P = 0-15$ (slope) and $L = 0-1$ (loading), the predetermined numbers are defined in Table F.

TABLE F

| Predetermined Number | No. of Values | Multiplied by | Stored As |
|---|---|---|---|
| $SN1(L) = W_p/(W_p + 2/T)$ | 2 | 1 | SN1(L) |
| $SN2(L) = 2/T/(W_p + 2/T)$ | 2 | 1 | SN2(L) |
| $SN3(P) = G_s/4$ | 16 | 1 | SN3(P) |
| $SN4(P) = (1/G)$ | 16 | ½ | SN4(P)/2 |

Note: The prewarped value of $W_p$ is in the above.

The coefficients are then calculated using the predetermined numbers and provisioned values of L and P, and then multiplied by a factor to provide a number for storage that is less than 1. The coefficients are defined in terms of the predetermined numbers of Table F in Table G, for the provisioned.

TABLE G

| Coefficient | Definition |
|---|---|
| A0 | 1 |
| A1(L) | SN2(L) − SN1(L) |
| B0(LP) | [(SN1(L)*SN4(P)) + SN2(L)]*SN3(P) |

TABLE G-continued

| Coefficient | Definition |
|---|---|
| B1(LP) | [(SN1(L)*SN4(P)) − SN2(L)]*SN3(P) |

Note: The coefficients B0(LP) and B1(LP) include gain. Since B0 and B1 are multiplied by $G_s/4$ during the calculation, they must be multiplied by 4 during the application.

Figure 3:
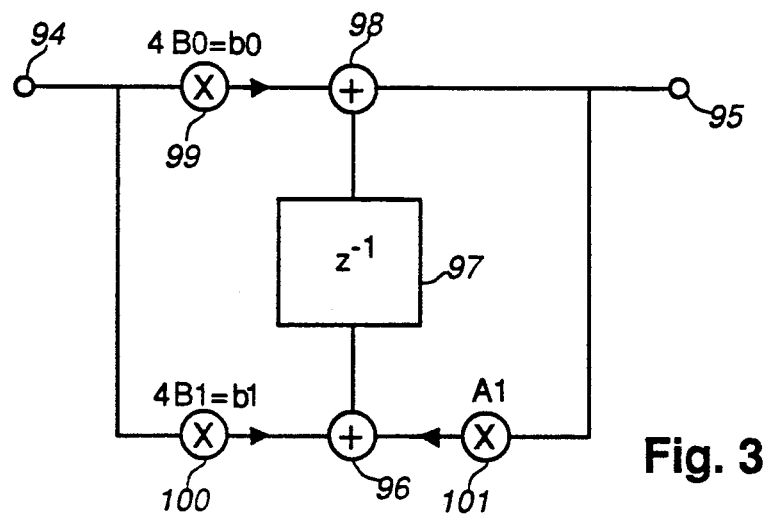
FIG. 3 illustrates in representational block diagram form a digital signal processor slope equalizer in accordance with an embodiment of the present invention.

In FIG. 3, a digital signal processor slope equalizer in accordance with an embodiment of the present invention is illustrated in representational block diagram form. The DSP slope equalizer representation includes an input 94, an output 95, a first adder 96, a one sample delay ($z^{-1}$) 97, and a second adder 98. A b0 multiplier 99 is coupled between the input 94 and the second adder 98. A b1 multiplier 100 is coupled between the input 94 to the first adder 96. An A1 multiplier branch 101 is coupled between the output 95 and the first adder 96.

In operation an input signal is applied to the input 94 to produce an output signal at the output 95. Products of coefficients b1=(B1*4) and A1 and the input and output signals, respectively, provided by the b1 and A1 multipliers branches 100 and 101, respectively, are summed by the first adder 96. The sum from the first adder 96 is then delayed one sample by the delay 97 before being summed with the product of the coefficient b0=(B0*4) and the input signal, provided by the b0 multiplier 99 to produce the output signal from the slope equalizer. Note, the coefficients B0(LP), B1(LP) include gain. Since B0 and B1 are multiplied by $G_s/4$ during calculation, they are restored by multiplication by 4 during application.

Table H relates the various coefficients discussed above for the slope equalizer. The coefficient calculated is stored in memory, e.g. RAM, for use by the DSP to provide the slope equalizer.

TABLE H

| Coefficient Defined | Coefficient Calculated | Coefficient Applied |
|---|---|---|
| $a_O$ | 1 | 1 |
| $a_1$ | $A1 = -a_1/a_O$ | A1 |
| $b_O$ | $BO = (G_s/4)*b_O/a_O$ | $bO = 4BO$ |
| $b_1$ | $B1 = (G_s/4)*b_1/a_O$ | $b1 = 4B1$ |

Figure 4:
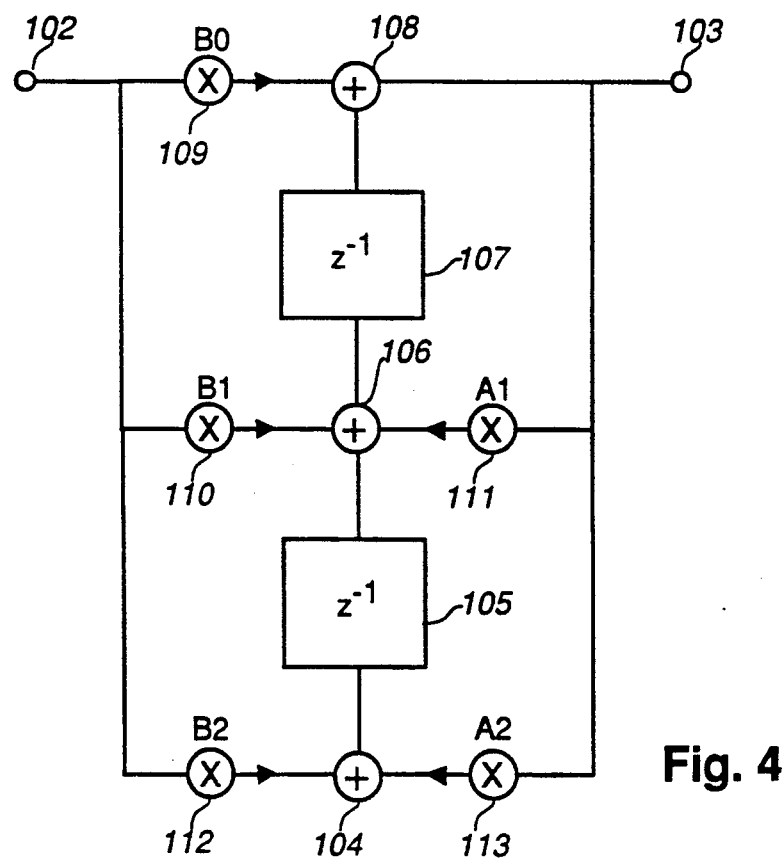
FIG. 4 illustrates in representational block diagram form a digital signal processor bump equalizer in accordance with an embodiment of the present invention.

To obtain the combined transfer function T(s) of equation (1), the slope equalizer of FIG. 3 and the bump equalizer of FIG. 4 are series connected.

In FIG. 4 a digital signal processor bump equalizer in accordance with an embodiment of the present invention is illustrated in representational block diagram form. The DSP bump equalizer representation includes an input 102, an output 103, a first adder 104, a first one sample delay ($z^{-1}$) 105, a second adder 106, a second one sample delay ($z^{-1}$) 107, and a third adder 108. A B0 multiplier 109 coupled between the input 102 and the third adder 108. A B1 multiplier 110 coupled between the input 102 and the second adder 106. An A1 multiplier 111 coupled between the output 103 and the second adder 106. A B2 multiplier 112 coupled between the input 102 and the first adder 104. An A2 multiplier 113 coupled between the output 103 and the first adder 104.

In operation an input signal is applied to the input 102 to produce an output signal at the output 103. Products of coefficients B2 and A2 and the input and output signals, respectively, provided by the B2 and A2 multipliers 112 and 113, respectively, are summed by the first adder 104. The sum from the first adder 104 is then delayed one sample by the first delay 105 before being summed, by the second adder 106, with products of coefficients B1=2b1 and A1=2a1, provided by the B1 and A1 multipliers 110 and 111, respectively, and the input and output signals, respectively. The sum from the second adder 106 is then delayed one sample by the second delay 107 before being summed, by the third adder 108, with the product of the coefficient $B0=3b_o$, provided by the B0 multiplier 108, and the input signal to produce the output signal from the bump equalizer.

Table I relates the various coefficients discussed above for the slope equalizer. The coefficient calculated is stored in memory, e.g. RAM, for use by the DSP to provide the bump equalizer.

TABLE I

| Coefficient Defined | Coefficient Calculated | Coefficient Applied |
|---|---|---|
| $a_O$ | 1 | 1 |
| $a_1$ | $[A1 = -a_1/a_O]*\frac{1}{2}$ | $2*a1 = A1$ |
| $a_2$ | $A2 = -a_2/a_O$ | A2 |
| $b_O$ | $[BO = b_O/a_O]*\frac{1}{3}$ | $3bO = BO$ |
| $b_1$ | $[B1 = b_1/a_O]*\frac{1}{2}$ | $2b1 = B1$ |
| $b_2$ | $B2 = b_2/a_O$ | B2 |

Figure 5:
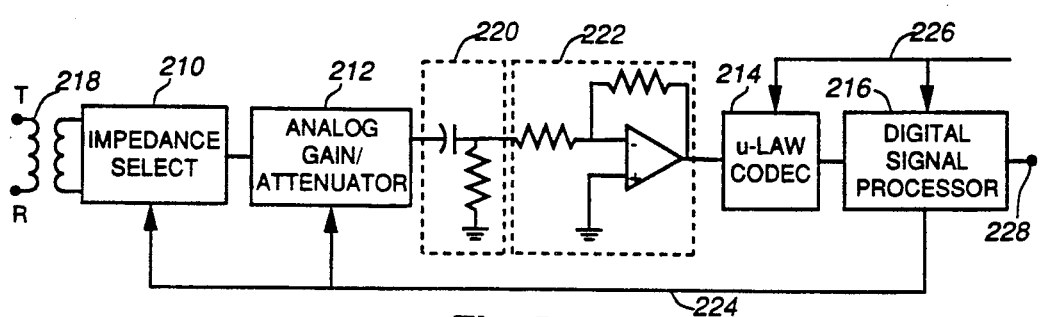
FIG. 5 schematically illustrates a transmit path of a DSP implementation of a line card.

Referring to FIG. 5, there is schematically illustrated a transmit path of a DSP implementation of a line card that includes the equalizer of FIGS. 3 and 4. The DSP implementation of a line card includes an impedance selector 210, an analog gain/attenuator 212, a CODEC 214 for providing μ-law compressed data and a digital signal processor (DSP) 216. The DSP implementation of a line card also includes a transformer 218 for interfacing with the line and a low frequency compensation circuit 220 and a fixed analog gain circuit 222. The CODEC 214 and the DSP 216 have inputs from a system clock 226. The DSP has an output 228 for transmitting a PCM signal to the network. The DSP 216 controls the impedance selector and gain/attenuator in accordance with provisioned settings of impedance and transmit level via a control channel 224. The transformer 218, the impedance selector 210, the analog gain/attenuator 212, the low frequency compensation circuit 220, the fixed analog gain circuit 222, the CODEC 214 and the DSP 216 are series connected. The DSP also has input for PCM from the network side (not shown in FIG. 5), for receiving signalling from the network. The signalling provides, for example, provisioning information such as the Q and gain settings for the equalizer.

In operation, the DSP performs digital equalization. As discussed above, because of the gain available for equalization, idle channel noise is of particular concern in the transmit path. Some form of idle channel noise compensation is required, however, noise reduction techniques, such as using squelch and quantization expansion have proven inadequate. A technique for reducing idle channel noise is provided in the above-referenced copending application.

Figure 6:
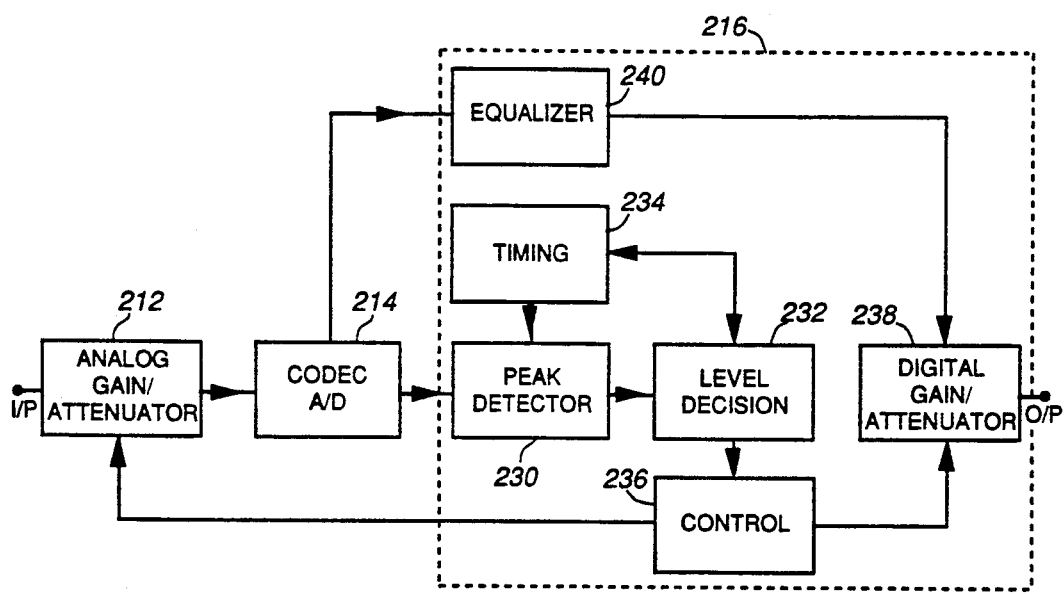
FIG. 6 illustrates in a block diagram, a transmit path of a DSP implementation of a line card including an equalizer in accordance with an embodiment of the present invention.

The transmit path of the DSP implementation of a line card, which includes the equalizer in accordance with an embodiment of the present invention, is illustrated in FIG. 6 in a block diagram. For simplicity of explanation only the analog gain/attenuator 212, the CODEC 214 and the DSP 216 are shown. The DSP 216 is shown including a peak detector block 230, a decision block 232, a timing block 234, a control block 236, a digital gain/attenuator block 238, an equalizer block 240 and a data storage block 250. The peak detector block 230 has inputs for data from the CODEC 214 and clock from the timing block 234, and output to the decision block 232. The equalizer block 240 is connected to the output of the CODEC 214 and has its output connected to the digital gain/attenuator block 238. The timing block 234 is connected to the peak detector 230 and the decision block 232. The control block 236 has an input connected to the decision block 232 and outputs connected to the analog gain/attenuator 212 and the digital gain/attenuator block 238.

Figure 7:
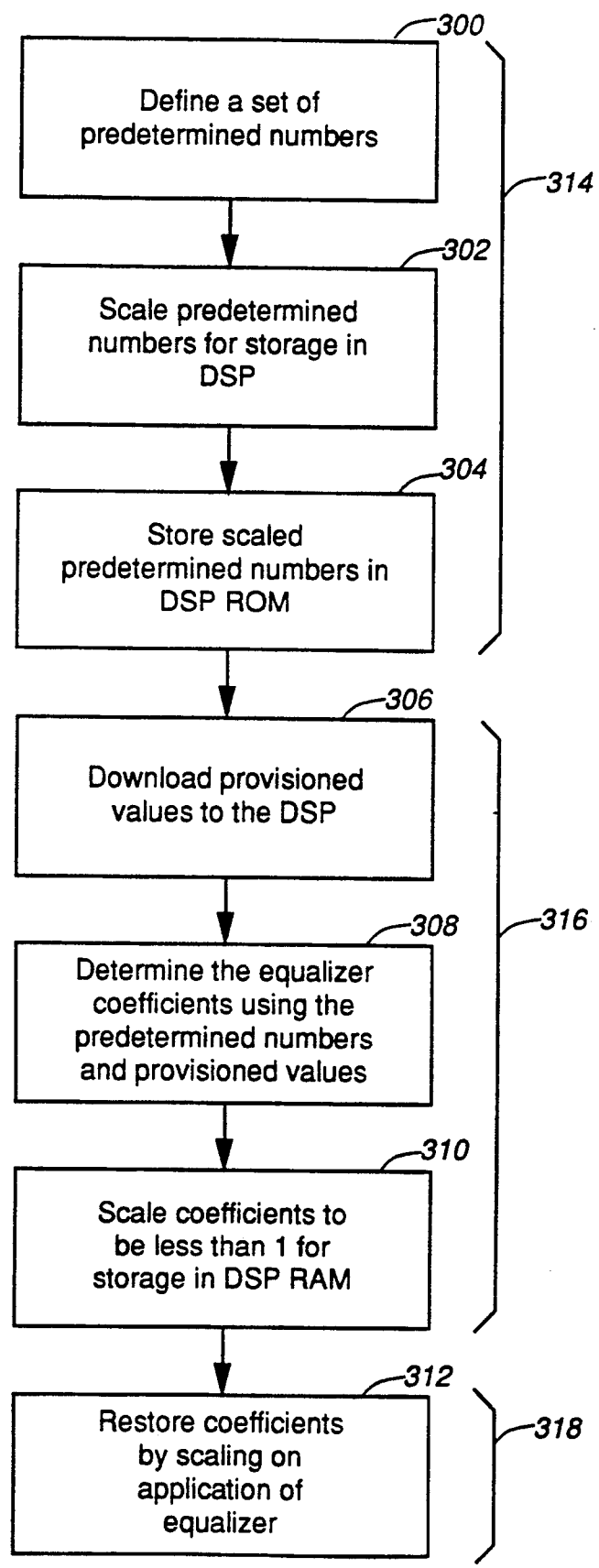
FIG. 7 illustrates a method of implementing an equalizer in an integrated circuit digital signal processor (DSP) in flow chart form.

Referring to FIG. 7, there is illustrated, in a flow chart, the method of implementing an equalizer in an integrated circuit DSP. The steps represented by blocks 300 through 312 are grouped in three phases 314, 316, and 318. Blocks 300, 302, and 304 represent the phase 314 of defining the set of predetermined numbers, from which equalizer coefficients are calculated, scaling and storing within the DSP ROM memory. Blocks 306, 308, and 310 represent the phase 316 of downloading provisioned values of the DSP, calculating equalizer coefficients from the provisioned values and the predetermined numbers and scaling the coefficients for storage in the DSP RAM memory. The block 312 represents the final phase 318 of restoring the coefficients within the equalizer on application to the input signal sample.

Numerous modifications, variations and adaptations may be made to the particular embodiments of the invention described above without departing from the scope of the invention, which is defined in the claims.

What is claimed is:

1. A method of implementing an equalizer in an integrated circuit digital signal processor (DSP), said method comprising the steps of:
    defining a set of predetermined numbers from which to calculate coefficients required for implementing the equalizer;
    scaling the set of predetermined numbers to allow storage within DSP; then
    storing the scaled set of predetermined numbers;
    for selected equalizer parameters, determining the coefficients using a subset of the set of stored predetermined numbers corresponding to the selected equalizer parameters; then
    scaling the coefficients to provide values thereof which are less than one;
    on application of the scaled coefficients within the DSP equalizer, restoring the coefficients by multiplying by appropriate scaling factors; and
    wherein the step of defining a set of predetermined numbers, for a slope equalizer, includes defining SN(L), SN2(L), SN3(LP), and SN4(LP) as: $SN1(L) = W_p/(W_p + 2/T)$, $SN2(L) = 2/T/(W_p + 2/T)$, $SN3(P) = G_s/4$, and $SN4(P) = (1/G)$, where L and P are the equalizer parameters $L = \{0,1\}$, $P = \{0, 1, 2, \ldots, 15\}$; $W_p$ = slope pole frequency, and a prewarped value of $W_p$ is determined from $W_{prewarped} = (2/T)*\tan(T*W_{analog}/2)$; and $G_s$ = gain of the slope equalizer and wherein the step of storing the set of predetermined numbers includes:
    storing,
    SN1(L) as SN1(L);
    SN2(L) as SN2(L);
    SN3(P) as SN3(P); and
    SN4(P) as SN4(P)/2.

2. A method as claimed in claim 1 wherein the step of scaling the set of predetermined numbers includes multiplying SN1(L) by 1, SN2(L) by 1, SN3(LP) by 1, and SN4(LP) by ½.

3. A method as claimed in claim 2 wherein the first, second, and third slope equalizer coefficients are B1, A1 and B0, and are calculated from:

$$A1(L) = SN2(L) - SN1(L);$$

$$B0(LP) = [(SN1(L)*SN4(P) + SN2(L)]*SN3(P);$$

$$B1(LP) = [(SN1(L)*SN4(P)) - SN2(L)]*SN3(P);$$

using provisioned values for L and P.

4. A method as claimed in claim 3 wherein the step of restoring the coefficients includes multiplying B0 by 4 and B1 by 4.

5. A method of implementing an equalizer in an integrated circuit digital signal processor (DSP), said method comprising the steps of:
    defining a set of predetermined numbers from which to calculate coefficients required for implementing the equalizer;
    scaling the set of predetermined numbers to allow storage within the DSP; then
    storing the scaled set of predetermined numbers;
    for selected equalizer parameters, determining the coefficients using a subset of the set of predetermined numbers corresponding to the selected equalizer parameters; then
    scaling the coefficients to provide values thereof which are less than one;
    on application of the scaled coefficients within the DSP equalizer, restoring the coefficients by multiplying by appropriate scaling factors;
    wherein the step of defining a set of predetermined numbers, for a bump equalizer, includes defining (SN1(N), SN2, SN3(M), SN4, and SN5(N) as:
    $SN1(N) = 2W_o/TQ_b$, $SN2 = 4/T^2 + W_o^2$,
    $SN3(M) = G_b$, $SN4 = -(W_o^2 - 4/T^2)$,
    $SN5(N) = 1/(SN1(N) + SN2)$, where M and N are the equalizer parameters $M = \{0, 1, 2, \ldots, 15\}$, $N = \{0, 1, 2, \ldots, 15\}$; $W_o$ = bump center frequency, and a prewarped value of $W_o$ is determined from $W_{prewarped} = (2/T)*\tan(T*W_{analog}/2)$ $W_{prewarped} = (2/T)*\tan(T*W_{analog}/2)$;

$Q_b$ = quality factor (Q) of the bump equalizer;
$G_b$ = gain of the bump equalizer; and
wherein the step of storing the set of predetermined numbers include:
    storing:
    SN1(N) as SN1(N)*SN5(O);
    SN2 as SN2*SN5(O);
    SN3(M) as SN3(M)*¼;
    SN4 as SN4*SN5(O); and
    SN5(N) as SN5(N)/SN5(O).

6. A method as claimed in claim 5 wherein the step of scaling the set of predetermined numbers includes multiplying SN1(N) by SN5(O), SN2 by SN5(O), SN3(M) by ¼, SN4 by SN5(O), and SN5(N) by SN5(O).

7. A method as claimed in claim 6 wherein the first, second, third, fourth, and fifth bump equalizer coefficients are B2, A2, B1, A1, and B0, respectively, calculated from:

$$A1(N) = SN4*SN5(N)*2;$$

$$A2(N) = (SN1(N) - SN2)*SN5(N);$$

$$B0(MN) = (SN2 + SN1(N)*SN3(M))*SN5(N);$$

$$B1 = -A1(N);$$

$$B1(MN) = (SN2 - SN1(N) * SN3(M)) * SN5(N);$$

using provisioned values for M and N.

8. A method as claimed in claim 7 wherein the step of scaling the coefficients includes multiplying A1(N) by ½, A2(N) by 1, B0(MN) by ⅓, B1(N) by ½, and B2(MN) by 1.

9. A method as claimed in claim 7 wherein the step of restoring the coefficients A1, A2, B0, B1, and B2 includes multiplying 20 by 2, 1, 3, 2, and 1, respectively.

* * * * *

UNITED STATES PATENT AND TRADEMARK OFFICE
CERTIFICATE OF CORRECTION

PATENT NO. : 5,226,059
DATED      : July 6, 1993
INVENTOR(S): Robert D. EASTERLING It is certified that error appears in the above-identified patent and that said Letters Patent is hereby corrected as shown below:

On title page, item [19] "Fasterling" should read --Easterling--

Item [75] "Robert D. Fasterling" should read --Robert D. Easterling--

Robert D. EASTERLING

Signed and Sealed this

Twenty-second Day of March, 1994

Attest:

BRUCE LEHMAN

Attesting Officer       Commissioner of Patents and Trademarks